(12) United States Patent
Marathe et al.

(10) Patent No.: US 9,619,010 B1
(45) Date of Patent: Apr. 11, 2017

(54) SELECTIVE POWERING OFF OF HARDWARE COMPONENTS FOR BATTERY MANAGEMENT IN MOBILE DEVICES

(71) Applicant: AMAZON TECHNOLOGIES, INC., Reno, NV (US)

(72) Inventors: Sandeep Chidambara Marathe, San Jose, CA (US); Patrick Mortera Orallo, Union City, CA (US); Roy Reichwein, Los Gatos, CA (US); Vidhyananth Ramasamy Venkatasamy, Sunnyvale, CA (US); Haili Wang, Fremont, CA (US)

(73) Assignee: Amazon Technologies, Inc., Reno, NV (US)

( * ) Notice: Subject to any disclaimer, the term of this patent is extended or adjusted under 35 U.S.C. 154(b) by 213 days.

(21) Appl. No.: 14/307,059

(22) Filed: Jun. 17, 2014

(51) Int. Cl.
*G06F 9/00* (2006.01)
*G06F 1/32* (2006.01)

(52) U.S. Cl.
CPC ................... *G06F 1/3287* (2013.01)

(58) Field of Classification Search
CPC .................................................. G06F 1/3287
USPC ........ 713/320, 300, 324, 322, 340; 715/771; 455/574
See application file for complete search history.

(56) References Cited

U.S. PATENT DOCUMENTS

| | | | | |
|---|---|---|---|---|
| 8,397,087 B1* | 3/2013 | Gardner | ................... | G06F 1/329 713/300 |
| 9,225,608 B1* | 12/2015 | Gabrielson | ........... | H04L 41/147 |
| 9,256,269 B2* | 2/2016 | Mallinson | .............. | G06F 1/3206 |
| 2007/0067657 A1* | 3/2007 | Ranganathan | ........ | G06F 1/3296 713/320 |
| 2007/0143640 A1* | 6/2007 | Simeral | ...................... | G06F 1/28 713/320 |
| 2009/0094473 A1* | 4/2009 | Mizutani | ............... | G06F 1/3203 713/340 |
| 2009/0172423 A1* | 7/2009 | Song | ..................... | G06F 1/3203 713/300 |
| 2010/0023790 A1* | 1/2010 | Cooper | ................. | G06F 1/3203 713/322 |
| 2010/0162024 A1* | 6/2010 | Kuris | .................. | G06F 11/3062 713/340 |
| 2011/0040996 A1* | 2/2011 | Hackborn | ........... | G06F 11/3409 713/340 |
| 2011/0251731 A1* | 10/2011 | Yang | ......................... | H02J 3/14 700/296 |
| 2012/0011504 A1* | 1/2012 | Ahmad | ................... | G06F 12/08 718/1 |
| 2013/0173947 A1* | 7/2013 | Nomura | ............. | G01R 31/3613 713/340 |
| 2014/0024416 A1* | 1/2014 | Xie | ................... | H04W 52/0261 455/574 |

(Continued)

*Primary Examiner* — Aurel Prifti
(74) *Attorney, Agent, or Firm* — Lowenstein Sandler LLP

(57) ABSTRACT

A processing device of a mobile device determines an activity level for a hardware component of the mobile device based on activity information associated with the hardware component. The processing device computes a score for the hardware component based on the activity level and a power consumption value of the hardware component, wherein the power consumption value indicates an amount of power used by the hardware component. The processing device determines whether to deactivate the hardware component based on the score.

22 Claims, 12 Drawing Sheets

(56) References Cited

U.S. PATENT DOCUMENTS

| | | | |
|---|---|---|---|
| 2014/0082384 A1* | 3/2014 | De Cesare | G06F 1/3206 713/320 |
| 2014/0115514 A1* | 4/2014 | Hackborn | G06F 3/0481 715/771 |
| 2014/0195843 A1* | 7/2014 | Lai | H04W 52/0209 713/324 |
| 2015/0177811 A1* | 6/2015 | Bose | G06F 1/3287 713/324 |

* cited by examiner

| POWER USAGE DATA STRUCTURE 405 ||||||||
| --- | --- | --- | --- | --- | --- | --- | --- |
| HW Module | MOV (V) | POWER (W) | Module Uptime (%) | Module Usage (%) | Savings (Delta) = (Uptime − Usage) * POWER | Default State (Boot-time) | New State ||
| | | | | | | | User 1 | User 2 |
| SoC / AP | 3.0V | | | | | C | C | C |
| PMIC | 3.0V | | | | | C | C | C |
| DRAM | 1.8V | | | | | C | C | C |
| Storage | 2.8V | | | | | C | C | C |
| Display – eINK | 3.2V | | | | | C | C | C |
| Touch Sensor | 1.8V | | | | | C | C | C |
| Display Brightness (Low Level) Front Light | 2.8V | | | | | C | C | C |
| Display Brightness (Mid / Hi Level) Front Light | 2.8V | | | | | O/LU | O/LU | O/HU |
| Wi-Fi – 802.11 a/b/g | 3.2V | | | | | O/LU | O/LU | O/LU |
| WAN – 3G | 3.2V | | | | | O/LU | O/LU | O/LU |
| Audio – codecs | 3.2V | | | | | O/LU | O/HU | O/LU |
| Video – basic rendering | 3.2V | | | | | O/LU | O/LU | O/LU |

KEY
O – optional
LU – low usage
HU – high usage
C – core

FIG. 4

SELECTIVE POWERING OFF OF HARDWARE COMPONENTS FOR BATTERY MANAGEMENT IN MOBILE DEVICES

BACKGROUND

Battery life is an important issue for mobile devices. Most users of mobile consumer devices are not aware of the hardware components that are enabled at any given time, or of the power consumption associated with those hardware components. A user may turn on, for example, a global positioning system (GPS) receiver and then forget to turn it off. This may cause the GPS receiver to drain the battery of the mobile device even though the GPS receiver is not in use. Moreover, even when hardware components are idle or when they are in a low power mode (e.g., suspended), these hardware components still consume power. Accordingly, a battery may be unnecessarily used to power modules that are not in use (even when those modules are in a low power mode). Hence, a user may be forced to charge the mobile device with increased frequency.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 4 illustrates an example power usage data structure.

DETAILED DESCRIPTION

Mobile devices have batteries with a finite amount of available power. Each hardware component of a mobile device consumes some amount of power when it is active, even when it is in a low power or suspended state. Thus, any hardware component that is not shut off will have some impact on battery life. The amount of power that each hardware component consumes may vary widely. For example, a global positioning system (GPS) receiver and a Wi-Fi® radio may consume much more power than a Bluetooth® radio or a light sensor. This may be true even if, for example, the GPS receiver or Wi-Fi radio are idle or are in a low power state.

Embodiments described herein provide a battery manager that scores hardware components based on some or all of power consumption, importance of the hardware components, and activity levels of the hardware components. For example, hardware components may be scored based on a ratio between activity level and power consumption. When a power conserving mode is enabled, the battery manager may automatically shut down hardware components with high scores. For example, a first hardware component with a high power consumption, a low importance level and a low activity level may have a high score, and thus may be shut off during a power conserving mode. In this example, high power consumption will increase the score, a low importance level will likewise increase the score, and a low activity level will increase the score. A second hardware component with a similarly low importance and high power consumption but a high activity level may have a lower score than the first hardware component (because it is more likely to be used, and activating from an OFF state may draw more power and/or take more time than awaking from a standby mode), and thus may remain operational without shutting off. A third hardware component with a low activity level, a low importance, and a low power consumption may have an intermediate score between that of the first hardware component and the second hardware component, and so may not be shut off during the power conserving mode or shut off after the first component but before the second component. There may be multiple power conserving modes, where some apply more aggressive power conserving policies than others. For example, a second (more aggressive) power conserving mode might shut off the first hardware component and the third hardware component from the above examples, but may not shut off the second hardware component.

The battery manager may monitor user interaction with various hardware devices and then determine what hardware devices to shut off (e.g., power off) or otherwise deactivate, and may automatically shut off or deactivate those devices without user input. Thus, a battery life of the mobile device may be prolonged with minimal impact to the user.

Figure 1:
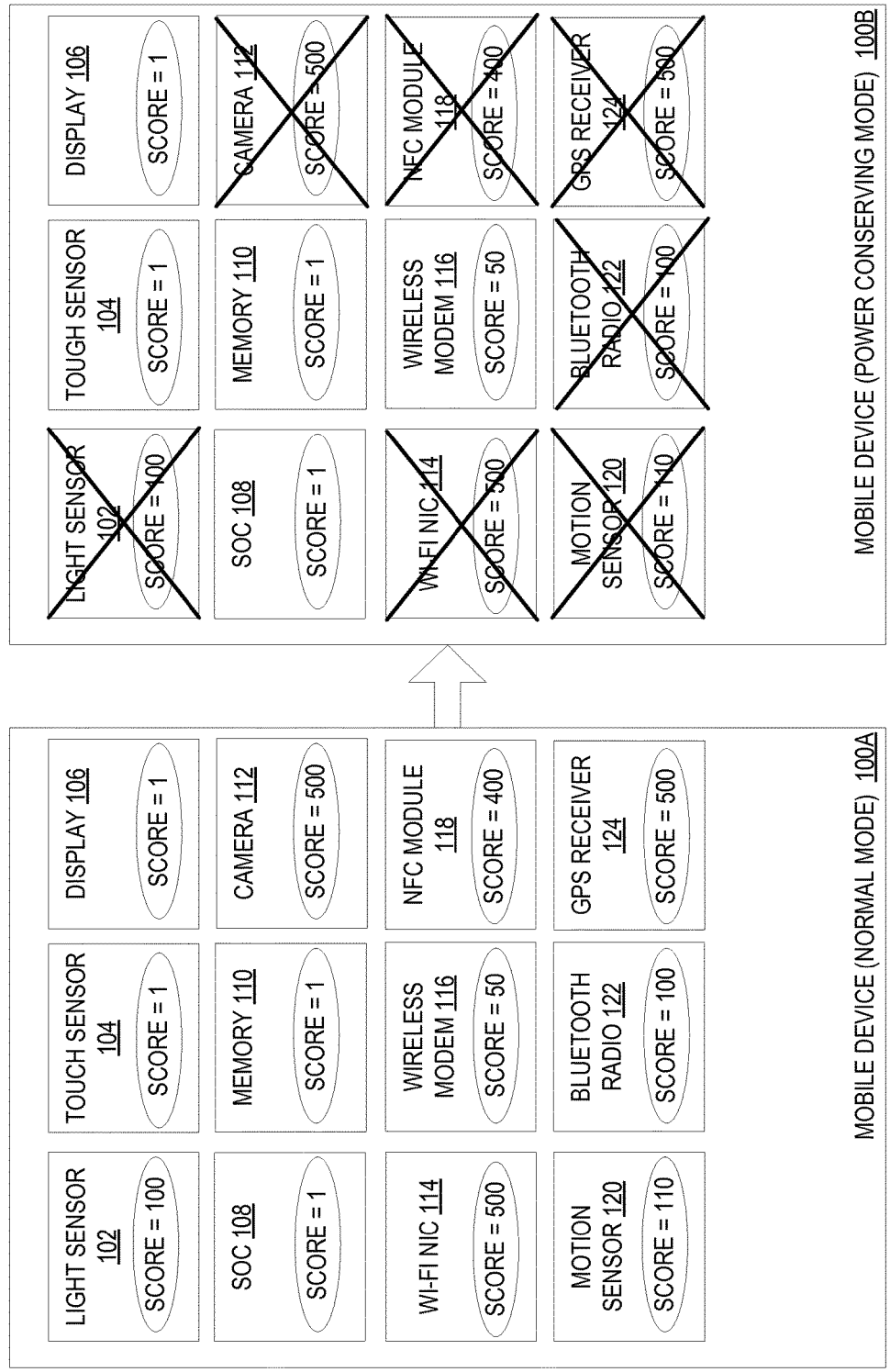
FIG. 1 is a block diagram of an example mobile device before and after a power conserving setting is enabled, in accordance with one embodiment.

FIG. 1 is a block diagram of an example mobile device in a normal mode of operation 100A and in a power conserving mode of operation 100B. The example mobile device includes multiple different hardware modules. As shown, the example mobile device includes a light sensor 102, a touch sensor 104, a display 106, a system on a chip (SOC) 108, a memory 110, a camera 112, a Wi-Fi network interface controller (NIC) 114, a wireless modem 116, a near field communications (NFC) module 118, a motion sensor 120, a Bluetooth radio 122, and a GPS receiver 124. The mobile device may also include other hardware components, and/or some of the illustrated hardware components may be omitted.

Each of the hardware components may have a specified or determined level of importance for the mobile device, which may represent a level of impact on the mobile device if these hardware components are disabled. For example, the mobile device probably cannot function if the SOC 108 or memory 110 were turned off. Additionally, a user experience may be negatively impacted if the display 106 or touch sensor 104 were turned off. Accordingly, these hardware components may have high importance values. Other components such as the light sensor 102, camera 112, Wi-Fi NIC 114, wireless modem 116, NFC module 118, motion sensor 120, Bluetooth radio 122 and/or GPS receiver 124 may have a lower level of importance. For example, unless the user is running specific applications of the mobile device that use one of these other hardware components, the user will likely not even notice if these components are disabled.

The importance applied to each hardware component may depend on the device type of the mobile device. For example, an electronic reader (e.g., an electronic book (ebook) reader) may function fine while the wireless modem 116 is disabled. However, a mobile phone may not be able to make calls while the wireless modem 116 is shut off. Accordingly, a mobile phone may have a higher importance value for the wireless modem 116 than, for example, an electronic reader.

The importance values for hardware components may be fixed or may be dynamic. In some instances, importance values for certain core hardware modules (e.g., a processor) are fixed, while importance values for other hardware modules may be changed dynamically. Importance values may vary depending on system context. For example, hardware components may have different importance levels depending on whether the mobile device has a system state that is active, idle, or in standby. The importance levels of hardware components may also depend on active applications. For example, the importance of a GPS receiver may be high while a navigation application is running, but may be low if the navigation application is not running. In another example, touch sensors may have a higher importance than a Wi-Fi module when the mobile device is active, but the Wi-Fi driver may have a higher importance than the touch sensors when the mobile device is in an inactive state.

Each hardware component may also have a certain power consumption value that reflects how much power that hardware component uses. The SOC 108, Wi-Fi NIC 114, wireless modem 116, display 106, camera 112 and GPS receiver 124 may each have a high power consumption rating, for example. In contrast, the light sensor 102, touch sensor 104, memory 110, NFC module 118, motion sensor 120 and Bluetooth radio 122 may have medium to low power consumption ratings. Each hardware component may have different power consumption ratings for their low power states, their idle states, and their active states. Power consumption of a component may be a fixed value that is based on a unit of activity (e.g., 0.2 mille-Watts per a unit of time). Accordingly, the amount of power consumption associated with a particular activity level may be computed based on multiplying the power consumption value of a component by a value associated with the activity level.

The mobile device may also monitor the activity of the different hardware components over time, and may determine activity levels for these hardware components. A battery manager of the mobile device may score each of the hardware components based on one or more of the importance value, the activity level and the power consumption rating of the hardware components. In one embodiment, high scores reflect low importance/high power usage components, while low scores reflect high importance/low power usage components. This is a design choice and can easily be modified so that high scores reflect high importance/low power usage components and low scores reflect low importance/high usage components.

In the shown example, a score of 1 has been computed for the display 106, the memory 110, the touch sensor 104 and the SOC 108. This is because these components are highly important. Intermediate scores of 100 for the light sensor 102, 100 for the Bluetooth radio 122, 110 for the motion sensor 120 have also been computed. These scores are intermediate because they may be of low importance and low activity level, but also consume little power. A lower score of 50 may be computed for the wireless modem 116 because the wireless modem 116 may be relatively important and may be in use regularly, but may also consume much power. High scores of 400 for the NFC module 118 and 500 for the camera 112, Wi-Fi NIC 114 and GPS receiver 124 may be computed because these components may have low activity, low importance and high power consumption.

When the mobile device is switched to the power conserving mode 100B, the battery manager may examine the scores associated with each of the hardware components, and may disable (e.g., power down or completely turn off) one or more of the hardware modules having scores that exceed some threshold (or that are less than some threshold). For example, the light sensor 102, camera 112, Wi-Fi NIC 114, NFC module 118, motion sensor 120, Bluetooth radio 122 and GPS receiver 124 may all be disabled because they have scores above the threshold. While these hardware components are disabled, the amount of power consumed by the mobile device may be reduced.

Figure 2:
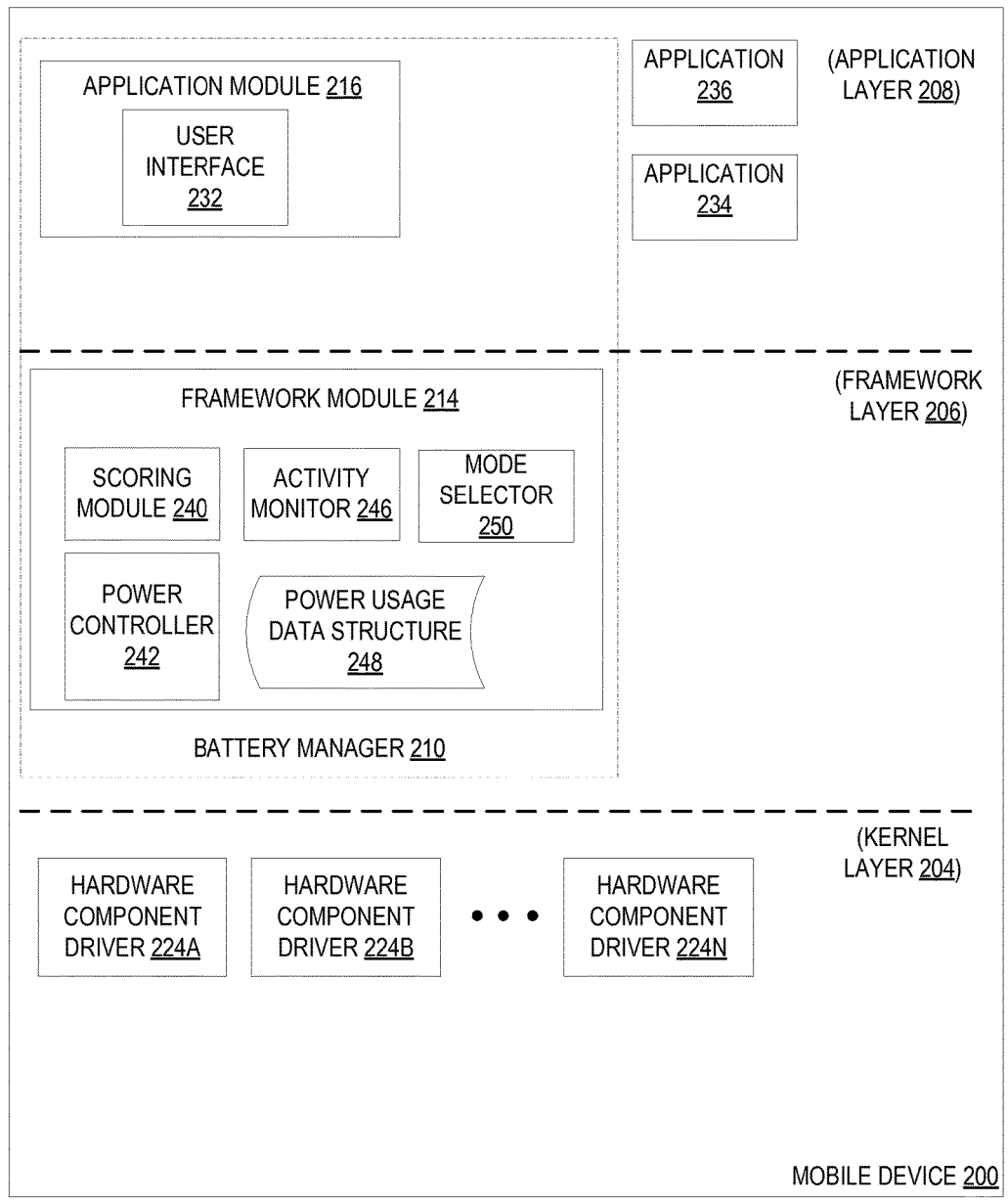
FIG. 2 is a block diagram of a logical view of a mobile device, in accordance with one embodiment.

FIG. 2 is a block diagram of a logical view of a mobile device 200, in accordance with one embodiment. The mobile device 200 is logically divided into a kernel layer 204, a framework layer 206 and an application layer 208. The kernel layer 204 is reserved for privileged processes, and provides access to operations that are not available at the framework layer 206 or application layer 208. The kernel layer 204 also acts as an abstraction layer between hardware and the higher layers (e.g., the framework layer 206 and application layer 208). Examples of processes that execute at the kernel layer 204 include privileged kernel processes, kernel extensions, and most device drivers. The kernel layer 204 may be used, for example, for core functionality such as memory management, process management, networking, and so forth.

The framework layer 206 provides higher-level services to applications. The framework layer 206 includes one or more framework modules that enable system services and applications to interface with lower level libraries. Modules in the framework layer 206 may provide APIs for interfacing with native libraries such as a window manager, media codecs, graphics engines, and so on. Some example framework modules may include an activity manager that manages the activity lifecycle of applications, a resource manager, and so forth.

Most processes operate at the application layer 208. Applications 234, 236 that run at the application layer 208 may include standard applications that are automatically included in the mobile device and additional applications, which may be third party applications and/or other applications that are not pre-installed on the mobile device 200. Examples of applications (or apps) 234, 236 include a social network application (e.g., a Facebook® app, a Google+® app, a LinkedIn® app, etc.), an electronic mail (email) application (e.g., a Yahoo® Mail! app, a Gmail® app, an OS X® mail app, etc.), a calendar application, games, a newsreader application, and so on.

The mobile device 200 includes a battery manager 210, which may include components at one or more of the kernel layer 204, framework layer 206 and/or application layer 208. In the illustrated embodiment, the battery manager 210 includes a framework module 214 at the framework layer 206 and an application module 216 at the application layer 208.

In one embodiment, framework module 214 is a low level daemon that may interact with drivers and other processes running at the framework layer 206 and/or application layer 208. Framework module 214 may include an activity monitor 246, a mode selector 250, a scoring module 240 and a power controller 242. Framework module 214 may also include or have access to a power usage data structure 248 that may be maintained by activity monitor 246.

Activity monitor 246 receives activity information from hardware component drivers 224A-224N that run at the kernel layer 204. Each hardware component driver 224A-224N interfaces with and controls a particular hardware component. Additionally, each hardware component driver 224A-224N is configured to record activity information of an associated hardware component over time. Activity information may be any metric that reflects how much and/or how often the hardware component is actually being used. One metric that indicates component activity of a hardware component is an interrupt count of a hardware component driver 224A-224N associated with that hardware component. The more interrupts issued by a hardware component driver 224A-224N, the more active the associated hardware component is. Another metric that may be used to determine an activity level of a hardware component is an amount of data handled by that hardware component, which may be recorded by the associated hardware component driver 224A-224N. Typically the more data that is handled by a hardware component (e.g., transmitted, stored, processed, etc.), the more active the hardware component is. The amount of data may be measured in kilobytes, megabytes, gigabytes, etc.

The hardware component driver 224A-224N may store the activity information, and then periodically report the activity information to the activity monitor 245. Reported activity information may include timestamps that identify dates and times that the activity occurred (e.g., when a hardware component driver 224A-224N issued an interrupt and/or when a hardware component handled data). Alternatively, the activity monitor 246 may assign timestamps to activity information when the activity information is received. Some or all hardware component drivers 224A-224N may report activity information using a push model, in which the hardware component drivers send activity information to the activity monitor 246 without prompting. Additionally, some or all hardware component drivers 224A-224N may report activity information using a pull model, in which the activity monitor 246 polls the hardware component drivers 224A-224N for the activity information. In one embodiment, the hardware component drivers 224A-224N include application programming interfaces (APIs) and/or callbacks that enable the activity monitor 246 to interface with the hardware component drivers 224A-224N to obtain the activity information.

In one embodiment, hardware component drivers 224A-224N record a simple activity count (in intercepts and/or data handled), and report the activity count at a predetermined interval. With each reporting, the drivers may clear their activity count and start over for the next interval. The activity monitor 246 in one embodiment manages callback interval counts in pipelined or circular buffers such that samples older than a certain number of callback intervals will be removed from the data set.

Activity monitor 246 uses the received activity information to determine present activity levels of the various hardware components as well as historical activity levels of the hardware components. Activity monitor 246 may, for example, determine an activity level (e.g., an interrupt count) over an hour, over a day, over a week, over a month, and so on. The hour window may accumulate into a 24 hour time frame, which may accumulate into a 7 day time frame, which may accumulate into a month time frame. Based on the determined activity levels of the hardware components over time, the activity monitor 246 may determine an activity pattern. For example, activity monitor 246 might determine that a particular hardware component is typically only active the first 10 minutes of every hour, then inactive for the rest of the hour. In another example, the activity monitor 246 might determine that a particular hardware component (e.g., the GPS receiver) is only active on the weekends and not during weekdays. Activity monitor 246 may also compute statistics on activity levels based on the activity information received from the hardware component drivers 224A-224N. Activity monitor 246 may compute average activity levels, peak activity levels, and so forth for hardware components.

Various activity level data may be determined based on the received activity information. Activity level may be determined based on time (e.g., time-specific activity level), based on location (e.g., location-specific activity level), and/or other information. Activity monitor 246 may determine activity levels at different times, at different locations, and at different combinations of times and locations. For example, activity monitor 246 may determine daytime activity levels at home, daytime activity levels at work, nighttime activity levels at home and nighttime activity levels at work.

Other contextual information may also be used to determine activity levels in various situations. In one embodiment, activity levels while the mobile device is under various acceleration conditions may be computed. An accelerometer and/or gyroscope may record motion data, which may be time stamped. Based on a combination of the motion data and the activity data, activity monitor 246 may determine activity levels while a user is jogging, moving, driving, etc. Activity monitor 246 may also determine activity levels while particular applications are running. For example, activity monitor 246 may determine activity levels during a presentation, while a navigation application is running (e.g., giving turn-by-turn instructions), and so forth. Activity monitor 246 may also determine activity levels based on context of nearby devices and/or a network or device connectivity state. For example, activity monitor 246 may determine an activity level during which the mobile device is directly connected to another device (e.g., paired to the other device via Bluetooth), while the mobile device is on a same local area network (LAN) as another device, during which the user device is in proximity to other particular devices, and so on. For example, activity monitor 246 may determine that an activity level of the mobile device is low (e.g., rarely used) while it is on a particular LAN or while it is near a particular other device. Other contextual information may also be used to determine context specific activity levels.

The activity monitor 246 maintains a power usage data structure 248. The power usage data structure may be a power usage table (PUT), a database, a spreadsheet, or other data structure containing information on power usage, component activity and/or importance values. In one embodiment, the activity monitor 246 periodically stores the power usage data structure 248 to non-volatile storage so that it can be used on subsequent boot-ups.

FIG. 4 illustrates one example of a power usage data structure 405. As shown, the example power usage data structure 405 includes a hardware module (also referred to as hardware component) field, a minimum operating voltage (MOV) field, a power field, a module uptime field, a module usage field, a savings field, a default activity/importance field, and one or more new activity/importance fields (e.g., for user 1 and user 2). The MOV field indicates the minimum operating voltage of a hardware module in Volts. The power field indicates the power consumption of a hardware module in Watts (voltage times current). The module uptime field may record the cumulative time that a hardware module has been powered on (whether in normal or a low power mode). The module usage field may record the cumulative time for the actual usage of the hardware modules. The power usage data structure 405 may alternatively include more or fewer fields. For example, the power usage data structure 405 may additionally include power consumption values for each of the hardware modules. The power consumption values may include an active power usage value, an idle power usage value and power usage value associated with a low power (suspended) state.

The power usage data structure 405 may initially be prepopulated with one or more default values. For example, the power usage values, importances and activity levels may initially be prepopulated. As data is collected by the activity monitor, the activity monitor may apply adaptive runtime learning to update one or more of these values. In the example power usage data structure 405, an SOC, power management unit (PMIC), dynamic random only memory (DRAM), secondary storage, display (electronic ink display), and low level brightness display setting are all indicated as core (C) modules (highest importance setting). The display brightness high setting, Wi-Fi chip, wireless area network (WAN) modem, audio codecs, and video accelerator all initially have a default activity level of low usage (LU) and an importance setting of optional (O). However, over time, the audio codecs may be identified as having a high activity level (HU) for a first user (user 1). Similarly, the high display brightness may be identified as having a high activity level for a second user (user 2). The module uptime may be computed as a percentage of time that the module is turned on, and the module usage may be computed as the percentage of time that the module is actually used. For each hardware module a savings may be computed by determining a delta between the uptime and the usage, and multiplying by the power usage.

In one embodiment, the power usage data structure 405 additionally includes a score or priority field (not shown). Scoring of hardware modules is discussed in greater below with reference to FIG. 2.

Returning back to FIG. 2, power usage data structure 248 includes some or all of the aforementioned fields, some or all of which may be prepopulated with default values initially. As activity monitor 246 gathers activity information, activity monitor 246 may update and/or replace some of the default values in the power usage data structure.

Scoring module 240 may use the default and/or updated values to compute scores for the various hardware components. These scores may be stored in the power usage data structure 248 or in a separate data structure. The score (also referred to as a priority) for each hardware module is computed based on a combination of at least the power consumption of the hardware module and the activity level of the hardware module. This enables a battery manager to compare different hardware modules to determine how much will be gained by turning each of them off. For example, a module that uses moderate or even low power may be turned off if it goes unused for a period of time.

In one embodiment, the score is computed for a hardware component using the activity level, the importance value and the power consumption value of that hardware component. This enables the power controller 242 to prioritize which hardware to shut down taking into consideration the importance of the hardware, how much the hardware is used, and how much power the hardware consumes. The first hardware components that are shut off are those that use large amounts of power but that might be of low importance and/or used rarely. On the other hand, the last hardware components to be shut off will be those that are very important and/or that are used frequently.

In one embodiment, an increase in the activity level contributes to a decrease in the score, an increase in the importance value contributes to a decrease in the score, and an increase in the power consumption rating contributes to an increase in the score. In such an embodiment, hardware components having high scores are ranked before hardware components having lower scores. Alternatively, an increase in the activity level contributes to an increase in the score, an increase in the importance value contributes to an increase in the score, and a decrease in the power consumption rating contributes to an increase in the score. Such a scenario is shown in FIG. 5.

Figure 5:
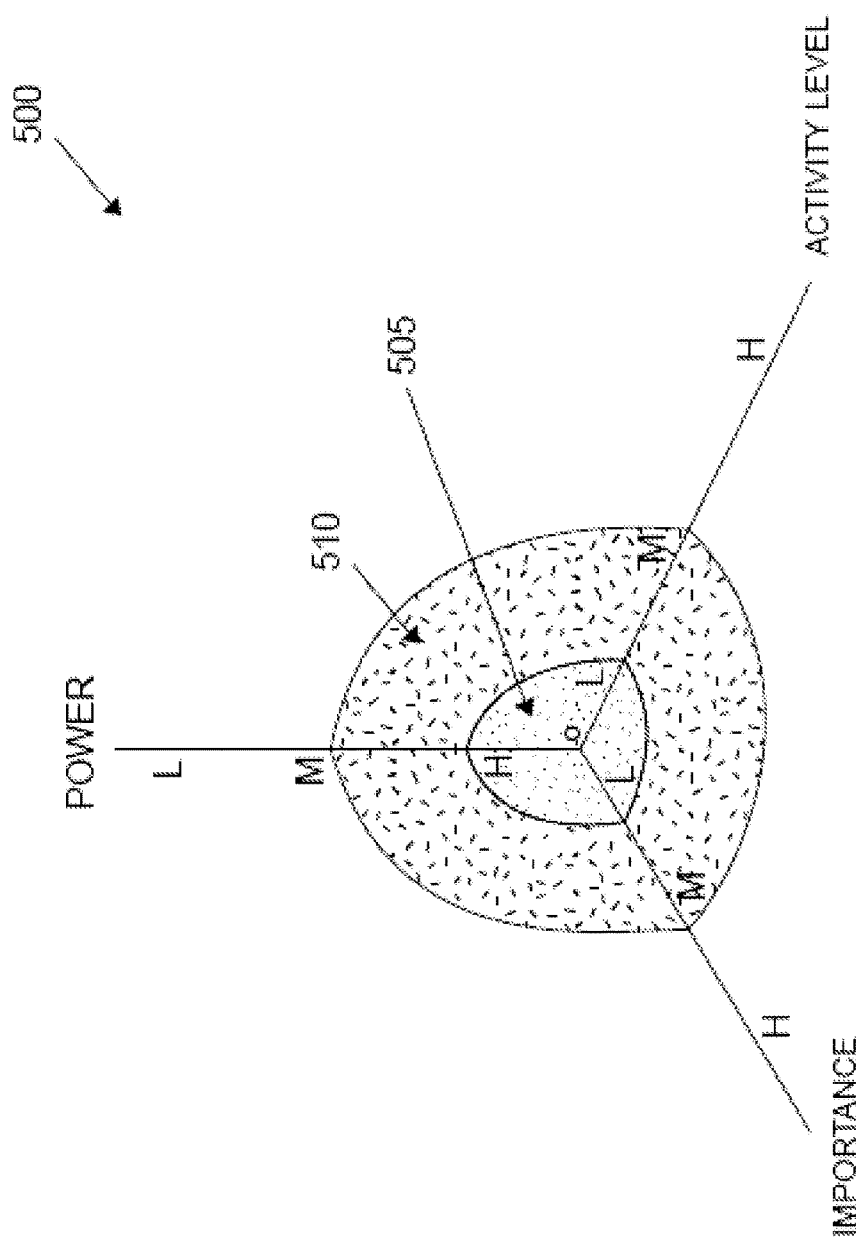
FIG. 5 is a three dimensional chart showing the scoring of hardware components based on power consumption, activity level and importance value, in accordance with one embodiment.

Referring now to FIG. 5, a three dimensional chart 500 showing the scoring of hardware components based on power consumption, activity level and importance value is illustrated, in accordance with one embodiment. As shown, a first axis represents importance, with importance increasing as a distance from the origin is increased. For example, importance levels of low (L), medium (M) and high (H) are shown on the first axis. A second axis represents activity level (e.g., which may be represented as an interrupt count). The activity level increases as a distance from the origin increases along the second axis. For example, activity levels of low (L), medium (M) and high (H) are shown on the second axis. A third axis represents power consumption. The power consumption decreases as the distance from the axis increases. For example, a high power consumption (H) mark is shown at the origin, a medium power (M) mark is then shown along the third axis, and a low power consumption (L) mark is then shown further from the origin along the third axis. The scores for each of the hardware components can be computed as three dimensional vectors, having coordinates for power consumption, importance value and activity level.

Two approximately concentric spherical regions 505 and 510 are shown in the chart 500. The borders of each spherical region 505, 510 represent a threshold associated with a power conserving setting. When a first (conservative) power conserving setting is active, any hardware component having a score (vector) that lies inside of the first spherical region 505 is turned off, and hardware components having scores that lie outside of the first spherical region 505 remain turned on. When a second (aggressive) power conserving setting is active, any hardware component having a score (vector) that lies inside of the second spherical region 510 is turned off.

Referring back to FIG. 2, in one embodiment the scoring module 240 ranks the hardware components based on their scores. Hardware components with the highest rank may provide the most energy savings with the least user impact when turned off, while hardware components with the lowest rank may cause the most user impact when turned off. Alternatively, low rank may be associated with high energy savings and low user impact, and high rank may be associated with low energy savings and/or high user impact.

Mode selector 250 selects a current power conserving mode (if any) to apply. Mode selector 250 may be configured to select whether to apply a power conserving mode (and which power conserving mode to apply) based on a current battery level. For example, mode selector 250 may be configured not to apply any power conserving setting when a battery is above 50%, to apply a conservative power conserving setting when the battery is at or below 50%, and to apply an aggressive power conserving setting when the battery drops below 30%. Other thresholds may also be used, and more or fewer power conserving settings may be used. For example, some users might request that the aggressive power conserving setting always be on, while others might request that the aggressive power conserving setting apply when the battery reaches 20%.

Each power conserving mode may be associated with a different deactivation rule or set of deactivation rules. For example, a conservative power conserving setting may deactivate hardware components having a score that exceeds a first threshold, where these hardware components are those that might consume large amounts of power and are unimportant and little used. An aggressive power conserving setting may deactivate hardware components having a score that exceeds a second threshold, where these hardware components are those that might consume moderate or little power, but are optional and used infrequently or moderately.

In another example, in addition to or instead of applying thresholds to determine which hardware components to shut off, a deactivation rule may specify a particular number of hardware components to shut off or a particular amount of energy savings that is to be gained. The hardware components may be ranked, and they may be shut off one by one according to their rank until the specified number of hardware components has been shut off or until the specified amount of power savings has been achieved. In some instances it may not be possible to reach the shut off goal (e.g., due to a user actively using some hardware components that might otherwise have been shut off).

Power controller 242 determines which hardware components to deactivate (e.g., power down or shut off entirely) by comparing the scores computed for hardware components to the deactivation rule (or rules) associated with a current power conserving mode. Those hardware components having scores that satisfy the deactivation rule or criteria are shut off by the power controller 242. To shut off a hardware component, power controller 242 may send an instruction to an appropriate hardware component driver 224A-224N instructing that driver to power down its associated hardware component.

In one embodiment, the battery manager 210 does not reveal to applications 236, 234 that the hardware components 224A-224N have been powered down. At a low level the hardware component gets shut down, but at a high level it still appears to the applications 234, 236 that these hardware components are active. The battery manager 210 may provide a false status of the hardware component, wherein the false status indicates that one or more hardware components are active even though they have been deactivated. Accordingly, the applications 234, 236 may still attempt to use any of the powered down hardware components. If this occurs, the hardware component is powered back on, and the application 234, 236 is able to use the hardware component.

The application module 216 of the battery manager 210 may include a user interface. The user interface 232 may be a graphical user interface (GUI) or command line user interface. User interface 232 may display usage level statistics/patterns, data from the power usage data structure 248, scores and/or rankings of the hardware components. For example, user interface 232 may provide to a user a ranking of hardware components that might produce the most battery life extension with the least user impact if turned off.

The user interface 232 may also enable a user to easily select importance values to apply to hardware components and to set up power conserving settings. For example, user interface 232 may enable a user to define when to apply various power conserving settings, as well as deactivation rules to associate with such power conserving settings.

In one embodiment, power controller 242 may prompt a user via the user interface 232 to ask whether it is okay to shut off a hardware module before that hardware module is shut off. The user may be prompted for a particular hardware device a set number of times. If the user answers yes the set number of times, then the power controller 242 may thereafter automatically shut off the hardware component without first prompting the user. In one embodiment, an importance value assigned to a hardware component may be increased if a user indicated it is not okay to shut off the hardware component and/or may be decreased if the user indicates that it is okay to shut off the hardware component.

The user prompting may be one type of callback that the framework module 214 may perform. Other types of callback functions may also be performed by the framework module 214 and/or by specific hardware component drivers 224A-224N before a hardware component is powered down. For example, multiple different hardware components of the mobile device 200 may have the capability to perform certain operations. One type of callback function is a callback that causes a particular hardware component to perform an operation. For example, if data is to be transmitted wirelessly, that data may be transmitted via a Wi-Fi NIC or a WAN modem. If the WAN modem is turned off, then the hardware component driver of the WAN modem or the framework module 214 may perform a callback function to route packets through the Wi-Fi NIC rather than the WAN modem. In another example, if a location service is requested while a GPS receiver is turned off, then a callback function may be used by the framework module 214 and/or the hardware component driver for the GPS driver to determine a location of the mobile device 200 using the Wi-Fi NIC or WAN modem (e.g., by triangulation). Many other callback functions are also possible.

Figure 3:
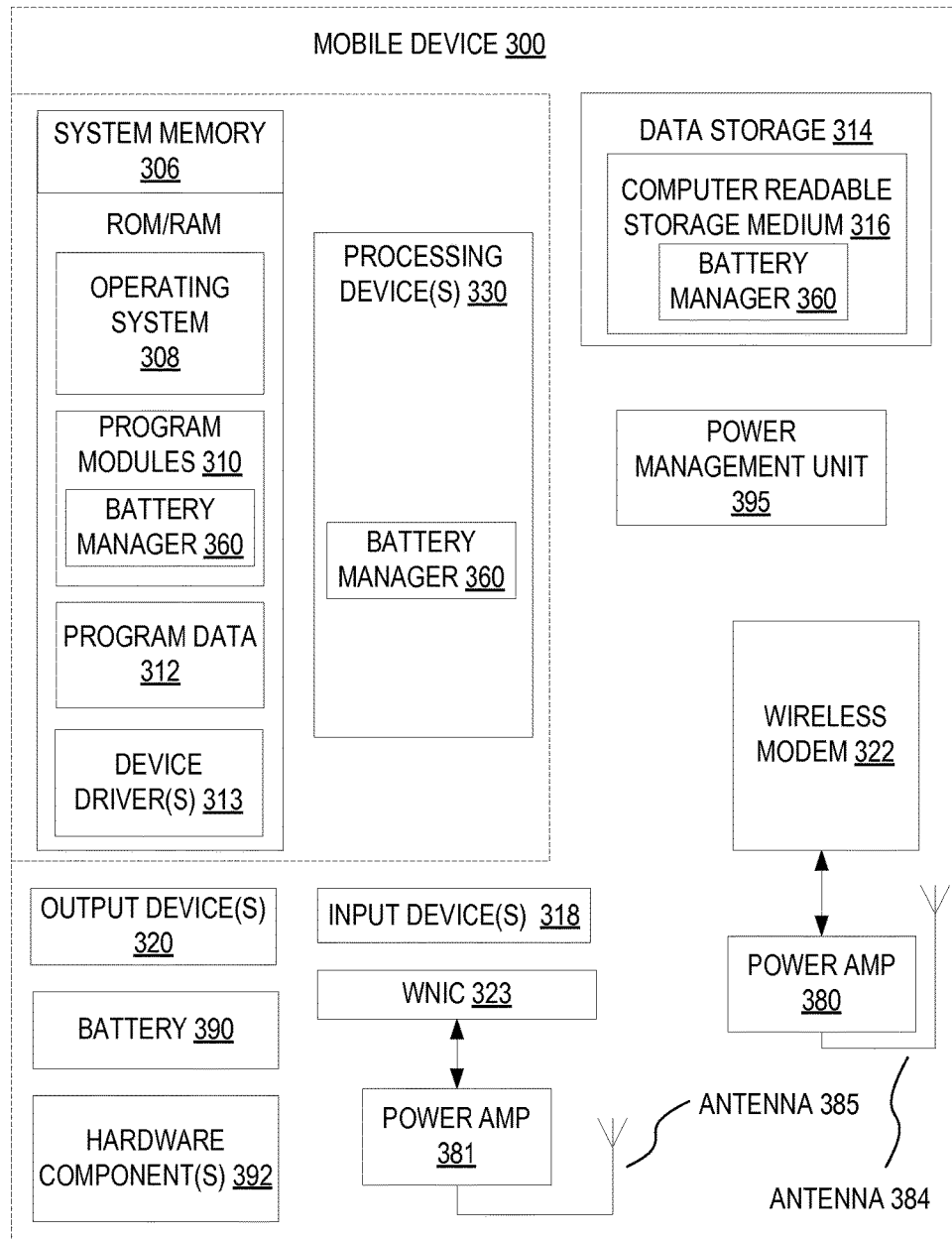
FIG. 3 is a block diagram illustrating an example mobile device with a battery manager, in accordance with one embodiment.

FIG. 3 is a block diagram illustrating an example mobile device 300 that includes a battery manager 360. The mobile device 300 may correspond to the mobile device 100A-100B of FIG. 1 and/or mobile device 200 of FIG. 2, and may be any type of mobile computing device such as an electronic book reader, a personal digital assistant (PDA), a mobile phone, a laptop computer, a portable media player, a tablet computer, a camera, a video camera, a remote control, an automobile, a wearable device (e.g., smart watch, body sensor, glasses, etc.), a barcode scanner, a portable speaker system, a netbook, a computing pad, or other battery powered device.

The mobile device 300 includes one or more processing devices 330. Each processing device may be a general purpose processing device (e.g., a microprocessor, central processing unit, or the like) or a special purpose processing device (e.g., an application specific integrated circuit (ASIC), a field programmable gate array (FPGA), a digital signal processor (DSP), network processor, or the like). The mobile device 300 also includes system memory 306, which may correspond to any combination of volatile and/or non-volatile storage mechanisms. The system memory 306 stores information which provides an operating system component 308, various program modules 310 such as for a battery manager 360, program data 312, device drivers 313, and/or other components. The mobile device 300 performs functions by using the processor(s) 330 to execute instructions provided by the system memory 306.

The mobile device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the battery manager 360 may reside, completely or at least partially, within the computer readable storage medium 316, system memory 306 and/or within the processing device(s) 330 during execution thereof by the mobile device 300, the system memory 306 and the processing device(s) 330 also constituting computer-readable media. The mobile device 300 may also include one or more input devices 318 (keyboard, mouse device, specialized selection keys, touchpad, touch screen, etc.) and one or more output devices 320 (displays, printers, audio output mechanisms, etc.).

Mobile device 300 may also include a battery 390 that provides a finite amount of power. The battery 390 may provide a consistent voltage and/or amperage to components of the mobile device 200 until the battery reaches a drained state at which the battery 390 can no longer provide the voltage and/or amperage. When the battery 390 reaches this state, the mobile device may be suspended and/or turned off.

The mobile device 300 may further include a wireless modem 322 to allow the mobile device 300 to communicate via a wireless network (e.g., such as provided by the wireless communication systems) with other computing devices, such as remote computers, the server systems, and so forth. The wireless modem 322 may allow the mobile device 300 to handle both voice and/or non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), long term evolution (LTE), worldwide interoperability for microwave access (WIMAX), etc. The wireless modem 322 may generate signals and send these signals to power amplifier (amp) 380 for amplification, after which they are wirelessly transmitted via antenna 384. In addition to sending data, antenna 384 may also receive data (e.g., network packets), which is sent to wireless modem 322.

The mobile device 300 may further include a wireless network interface controller (WNIC) 323 to allow the mobile device 300 to communicate via a wireless network (e.g., such as provided by the wireless communication systems) with other computing devices, such as remote computers, the server systems, and so forth. The WNIC 323 may be a Wi-Fi NIC, a Bluetooth NIC, a Zigbee NIC, or other wireless NIC.

The WNIC 323 may generate signals and send these signals to power amplifier (amp) 381 for amplification, after which they are wirelessly transmitted via antenna 385. In addition to sending data, antenna 385 may also receive data (e.g., network packets), which is sent to WNIC 323. In one embodiment, the wireless modem 322, the WNIC 323 and the processing device(s) 330 are each discreet devices (e.g., each discreet integrated circuits). Alternatively, one or more of the wireless modem 322, WNIC 323 and processing devices 330 may be logics of a single integrated circuit.

In one embodiment, the mobile device 300 includes a power management unit 395. The power management unit 395 is hardware (e.g., a microcontroller) that governs power functions of the mobile device 300. The power management unit may include a processing device, firmware, software, memory, input/outputs, timers, analog to digital converters, and/or other components. The power management unit 395 may monitor power connections and battery charge, charge the battery 390 when appropriate, control power to other hardware components (e.g., to hardware components 392, wireless modem 322, WNIC 323, system memory 306, data storage 314, and so on), shut down components and/or perform other operations. In one embodiment, the battery manager 360 communicates with the power management unit 395 to shut down and/or power on hardware components. In one embodiment, the battery manager 360 and/or at least one module of the battery manager 360 runs on the power management unit 395.

Mobile device 300 may additionally include one or more additional hardware components 392, such as a light sensor, hardware accelerators (e.g., audio codecs, graphics processors, etc.), a touch sensor, a proximity sensor, an accelerometer, a gyroscope, and so forth.

FIGS. 6A-7B are flow diagrams of various embodiments of methods related to determining when to shut off or power down hardware components of a mobile device to conserve battery life. The methods are performed by processing logic that may include hardware (circuitry, dedicated logic, etc.), software (such as is run on a general purpose computer system or a dedicated machine), firmware, or some combination thereof. In one implementation, the methods may be performed a mobile device, which may correspond to mobile device 100A-100B of FIG. 1, mobile device 200 of FIG. 2 and/or mobile device 300 of FIG. 3.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 6A:
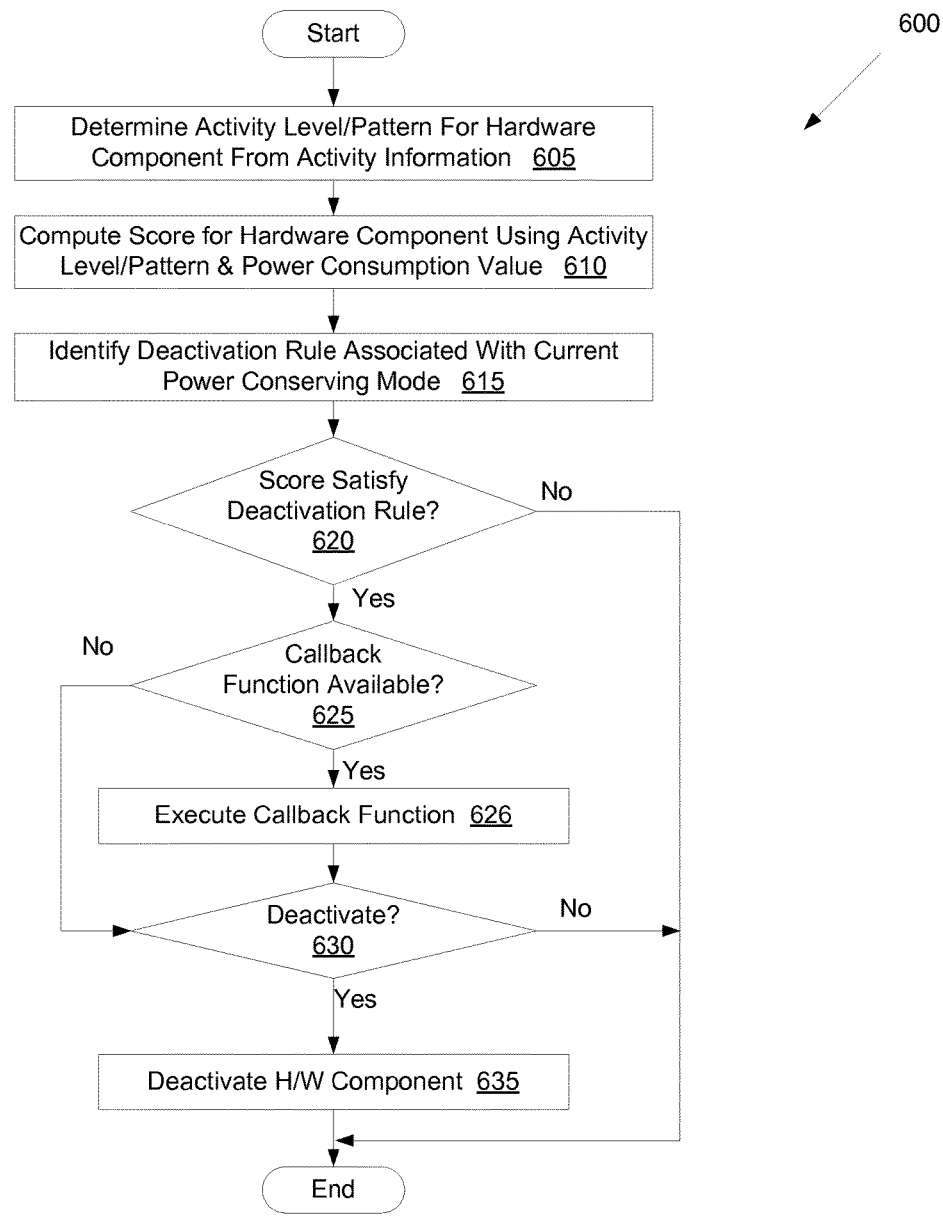
FIG. 6A is a flow diagram of an embodiment for a method of determining when to deactivate hardware components of a mobile device.

FIG. 6A is a flow diagram of an embodiment for a method 600 of determining when to deactivate a hardware component of a mobile device. Method 600 may be applied separately to each hardware component of the mobile device in one embodiment. At block 605 of method 600, processing logic determines an activity level for a hardware component from activity information collected from hardware component drivers. In one embodiment, processing logic determines an activity pattern, and then determines a current or predicted future activity level based on the activity pattern.

At block 610, processing logic identifies a power consumption value associated with the hardware component. The power consumption value may be determined from a stored power consumption rating. In one embodiment, the power consumption value is a normalized power consumption value that has been normalized across all or a subset of the hardware components. The power consumption value may indicate a normalized amount of power consumed per unit of activity (e.g., per interrupt, per MB of data processed, per minute of activity, etc.). Processing logic may then compute a score for the hardware component using the activity level and the power consumption value. For example, processing logic may compare how much data is going through each hardware component and/or how much processing is being performed by each hardware component to how much power each hardware component is consuming to compute the score. In one embodiment, each interrupt and/or amount of data handled by a hardware component indicates some amount of power used by that hardware component. This amount of power per interrupt or amount of data may be different for each hardware component.

In one embodiment, processing logic additionally determines an importance value associated with the hardware module. The importance value may be based on how much the hardware module is used, how long it takes to power up the hardware module, whether the mobile device can function without the hardware component, an impact on a user experience associated with turning off the hardware component, and so on. In such an instance, processing logic may compute the score based on the importance value, the activity level and the power consumption value.

At block 615, processing logic determines a current power conserving mode and identifies a deactivation rule associated with the current power conserving mode. At block 620, processing logic then determines whether the score satisfies the deactivation rule. For example, processing logic may determine if the score is above a threshold, or if the hardware component has one of the highest 5 or highest 10 scores. If the score satisfies the deactivation rule, the method continues to block 625. Otherwise the method ends.

At block 625, processing logic determines whether any callback functions are available to be performed prior to deactivating the hardware module. If a callback function is available, the method continues to block 626. Otherwise the method proceeds to block 630.

At block 626, processing logic executes one or more callback functions. One such callback function is to prompt a user to inquire as to whether it is okay to deactivate the hardware component. A user may be prompted if the user has never been prompted before. Alternatively, a user may be prompted if he has requested to always be prompted before shutting off any hardware component or this hardware component in particular. A user might not be prompted if the user has selected a setting to automatically deactivate hardware components without user notification.

Some callback functions may reroute operations or commands originally addressed to the hardware component to other hardware components. For example, if the hardware component is a Wi-Fi NIC, then a callback function may route Wi-Fi traffic to a WAN modem. In another example, if the hardware component is a WAN modem, then the callback function may route voice calls and/or data packets to a Wi-Fi NIC. Other callback functions are also possible.

At block 630, processing logic determines whether to deactivate the hardware component. If a callback function was performed, the determination of whether to deactivate the hardware component may be based on a result of the callback function. The determination may additionally or alternatively be based on the deactivation rule being satisfied. A result of the callback function may indicate whether it is okay to deactivate the hardware component. For example, processing logic may prompt the user to ask if it is okay to deactivate the hardware component. If the user answers yes or fails to answer, then it may be okay to deactivate the component. If the user answers that it is not okay to deactivate the hardware component, then the hardware component should not be deactivated. In another example, there may be a core capability that is to remain active, but that core capability may be offered by multiple different hardware components. In one embodiment, the callback function is used to determine if there is another hardware component that can perform core operations of the hardware component that is to be deactivated. If such another hardware component is powered on, then it may be okay to deactivate the hardware component. If it is okay to deactivate the hardware component, the method continues to block 635. Otherwise, the method ends.

A block 635, processing logic deactivates the hardware component. In one embodiment, deactivating the hardware component includes completely shutting off the hardware component (e.g., removing all power from the hardware component). Alternatively, deactivating the hardware component may include powering down the hardware component into a low power or suspended state.

Figure 6B:
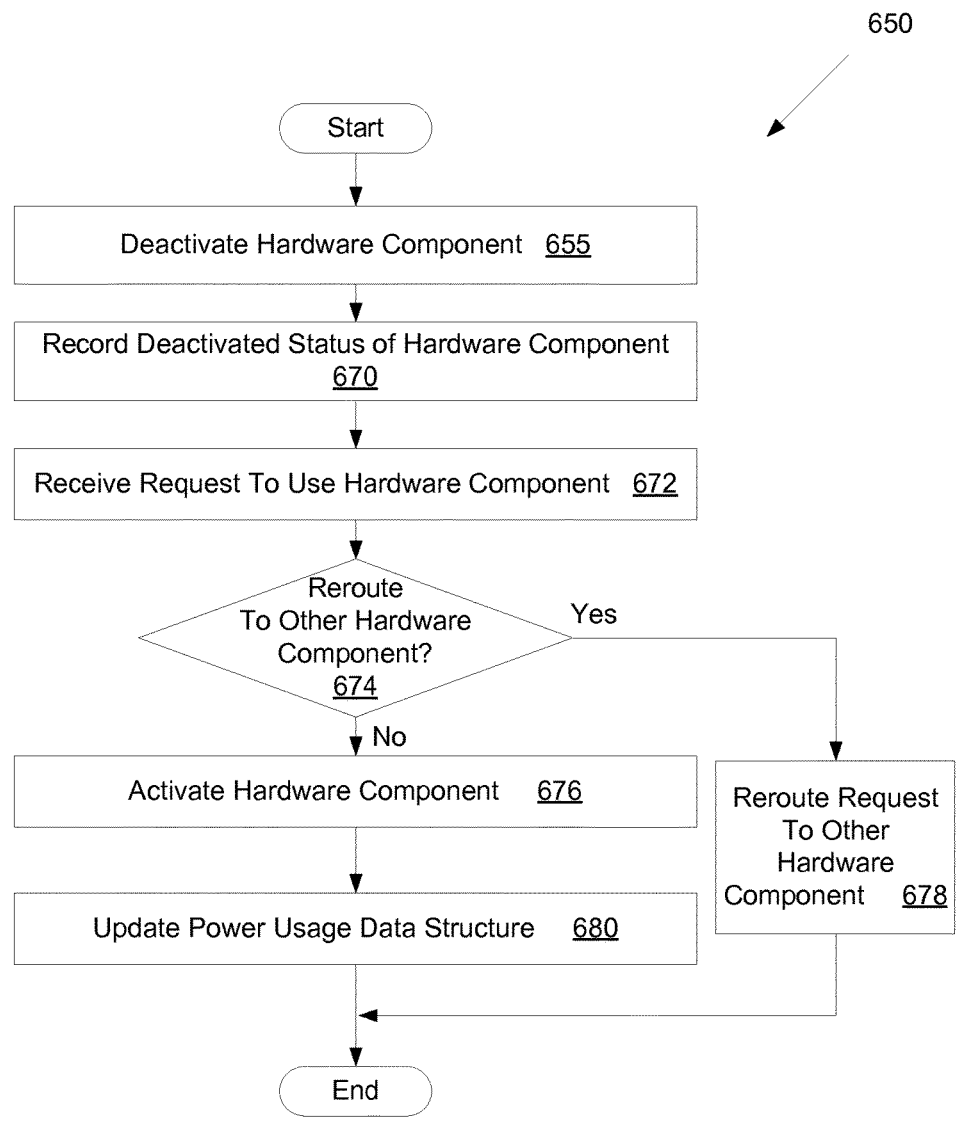
FIG. 6B is a flow diagram of an embodiment for a method of satisfying a request from an application to a deactivated hardware component.

FIG. 6B is a flow diagram of an embodiment for a method 650 of satisfying a request from an application to a deactivated hardware component. At block 655 of method 600, processing logic deactivates a hardware component. At block 670, processing logic records the deactivated status of the hardware component. The deactivated status may be recorded in a power usage data structure or in another data structure. The power usage data structure or other data structure may indicate for each hardware component whether that hardware component is active, idle, suspended, or powered off. Alternatively or additionally, the driver for the hardware unit may have information that indicates to the driver that the hardware component is deactivated (e.g., powered off).

At block 672, processing logic receives a request to use the deactivated hardware component. In one embodiment a driver of the hardware component is called by an application to perform an operation.

At block 674, processing logic determines whether to reroute the request to use the deactivated hardware component to another hardware component that is not deactivated. For example, processing logic may determine if a callback function was executed to reroute requests to the deactivated hardware component. If the request can be rerouted, the method continues to block 678, at which the request is rerouted to the other hardware component. If the request cannot be rerouted, the method continues to block 676.

At block 676, processing logic activates the deactivated hardware component. In one embodiment, the driver for the hardware component activates the hardware component and then sends a notification to a battery manager (e.g., via a callback function) that the hardware component has been activated. Alternatively, the battery manager may send an instruction to the driver to activate the hardware component. At block 680, the battery manager (e.g., an activity monitor of the battery manager) may update one or more values for the hardware component in the power usage data structure and/or other data structure.

Figure 7A:
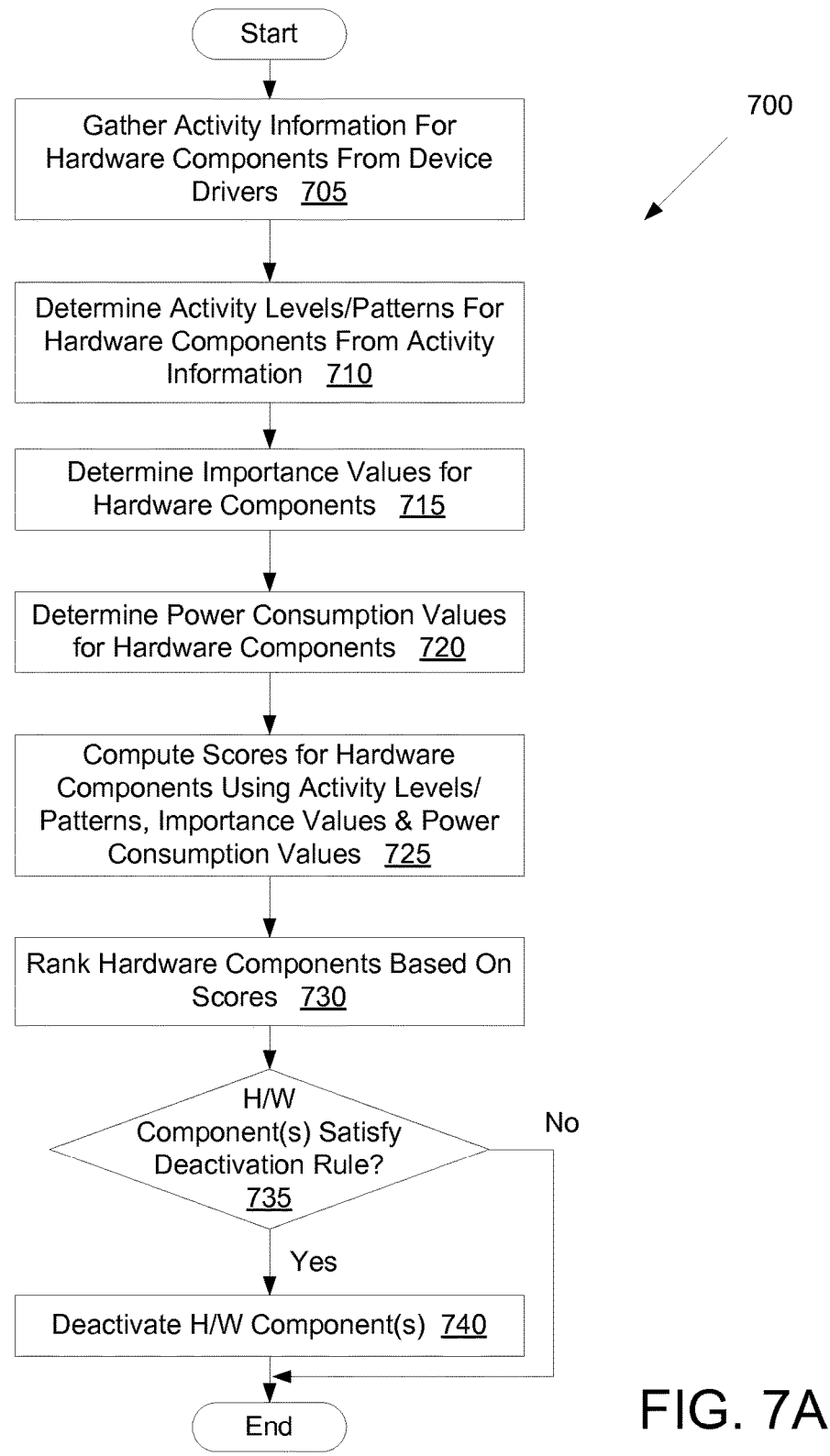
FIG. 7A is a flow diagram of another embodiment for a method of determining when to deactivate hardware components of a mobile device.

FIG. 7A is a flow diagram of another embodiment for a method 700 of determining when to deactivate hardware components of a mobile device. At block 705 of method 700, processing logic gathers activity information for hardware components from devices drivers that interface with those hardware components. At block 710, processing logic determines activity levels and/or activity patterns for those hardware components from the activity information.

At block 715, processing logic determines importance values for the hardware components. The importance values may be determined based on predefined default importance values and/or based on user interaction or input. For example, importance values may initially be the default values, and may then be adjusted over time based on activity levels of the hardware components that reflect how much a user uses each of these hardware components. The default importance values may be largely based on device type. For example, some or all electronic readers may have a first set of importance values for hardware components, while mobile phones may have a second set of importance values that might be very different from the first set. Similarly, tablet computers, laptop computers, digital cameras, mobile game consoles, and so forth may all have very different importance values assigned to their various hardware components.

At block 720, processing logic determines power consumption values for the hardware components. The hardware consumption values may also be preconfigured for the mobile device. However, unlike the importance values, the power consumption values are fixed. Power consumption values may be specific values (e.g., 1 milliwatts (mW), 1 W, 3 Watts, etc.) or may be ranges (e.g., 0-1 mW, 1-3 W, etc.). Some example power usages are around 400 mW for a max brightness front light, around 1 W for Wi-Fi and WAN modules, around 40 mW for an active SOC, around 20 mW for an idle SOC, and around 5 mW for a suspended SOC. The ranges may be used to reflect the fact that a particular component may use slightly different amounts of power over time and/or to account for variance between manufactured products. The power consumption values may be standard for a particular type and version of a device. For example, a first version of a particular electronic reader may have a unique set of power consumption values that is different from a second version of the particular electronic reader.

Each of the power consumption values may be divided into power consumption while idle, power consumption while active, and power consumption while suspended. Additionally, power consumption may be provided for each activity count (also referred to as a tick). The activity count may be an interrupt, or a kB of data processed, for example. In one embodiment, the power consumption per activity count is normalized across the hardware components. For example, a first hardware component may consume a first amount of power per interrupt, and a second hardware component may consume a second amount of power per interrupt that is 2.5 times greater than the first amount.

At block 725, processing logic computes scores for the hardware components based on the current or predicted future activity levels, the determined importance values and the identified power consumption values. At block 730, processing logic then ranks or prioritizes the hardware components based on their respective scores.

At block 735, processing logic determines whether any of the hardware components satisfy a deactivation rule associated with a current power conserving setting. If so, the method continues to block 740, and those hardware components having a score and/or rank that satisfies the deactivation rule are deactivated. Otherwise, the method ends.

Figure 7B:
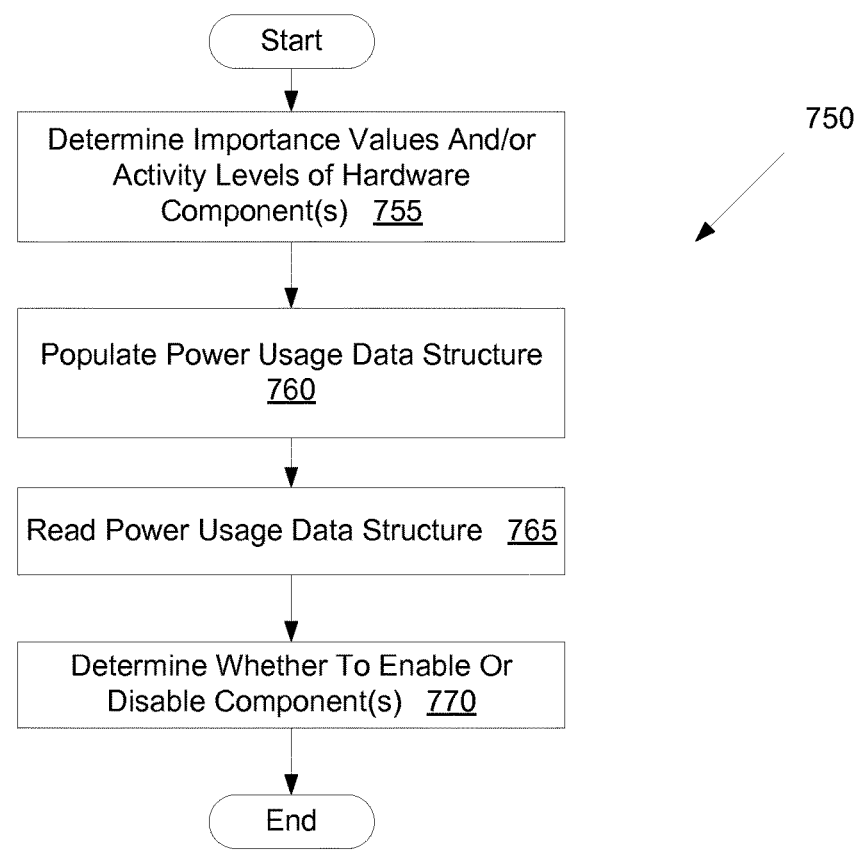
FIG. 7B is a flow diagram of an embodiment for a method of populating and using a power usage data structure.

FIG. 7B is a flow diagram of an embodiment for a method 750 of populating and using a power usage data structure. At block 755 of method 750, processing logic determines importance values and/or activity levels of one or more hardware components based on collected information. At block 760, processing logic populates one or more fields in a power usage data structure based on the determined importance values and/or activity levels. In one embodiment, an activity monitor populates the power usage data structure.

At block 765, processing logic reads the power usage data structure. In one embodiment, a power controller of a battery manager (e.g., power controller 242) reads the power usage data structure. At block 770, processing logic (e.g., the power controller 242) determines whether to enable or disable hardware components based on the reading of the power usage data structure and based on one or more policies. The method then ends.

Figure 8:
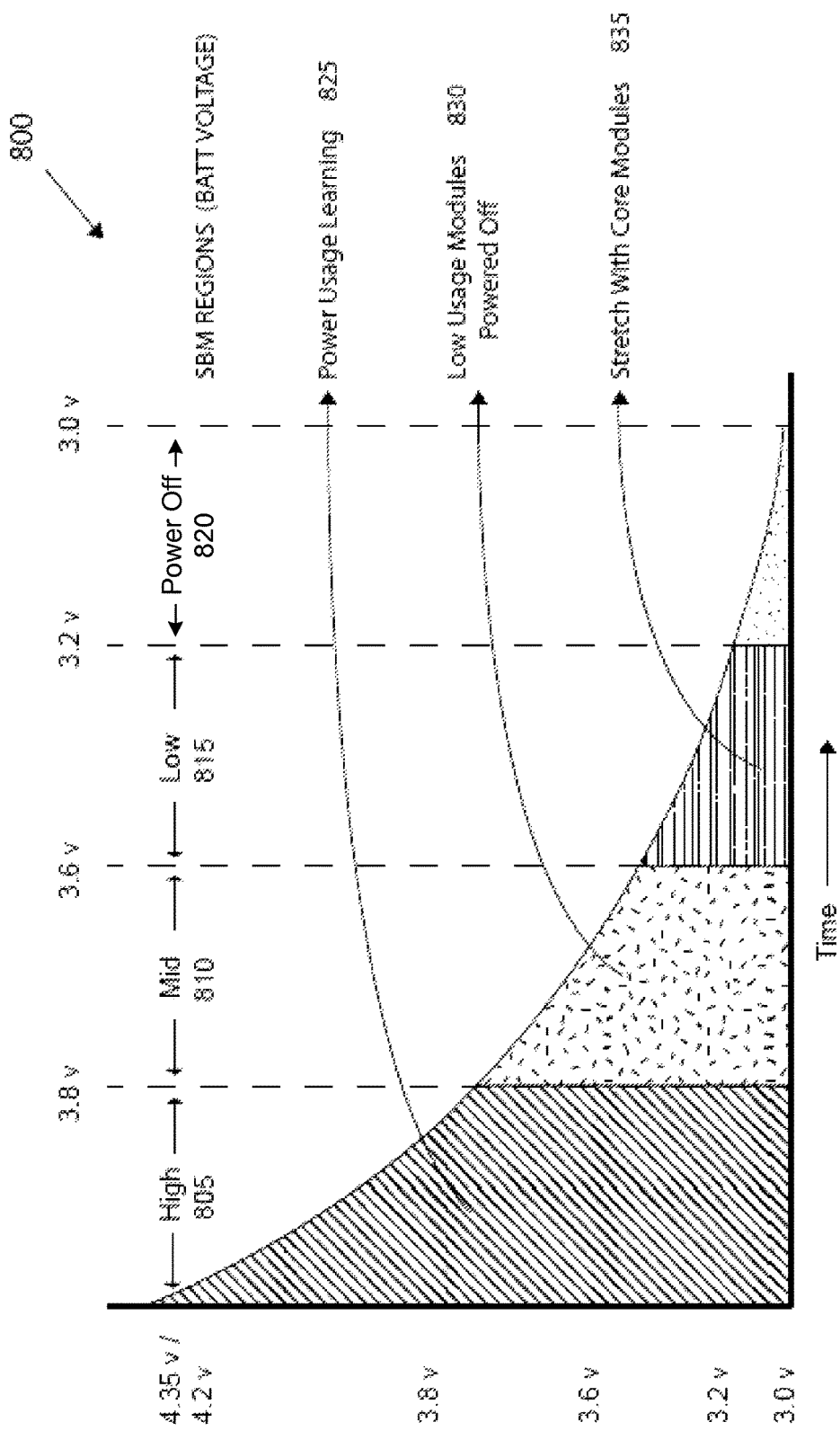
FIG. 8 is a chart showing power conserving settings applied at different battery voltage levels, in accordance with one embodiment.
Figure 9:
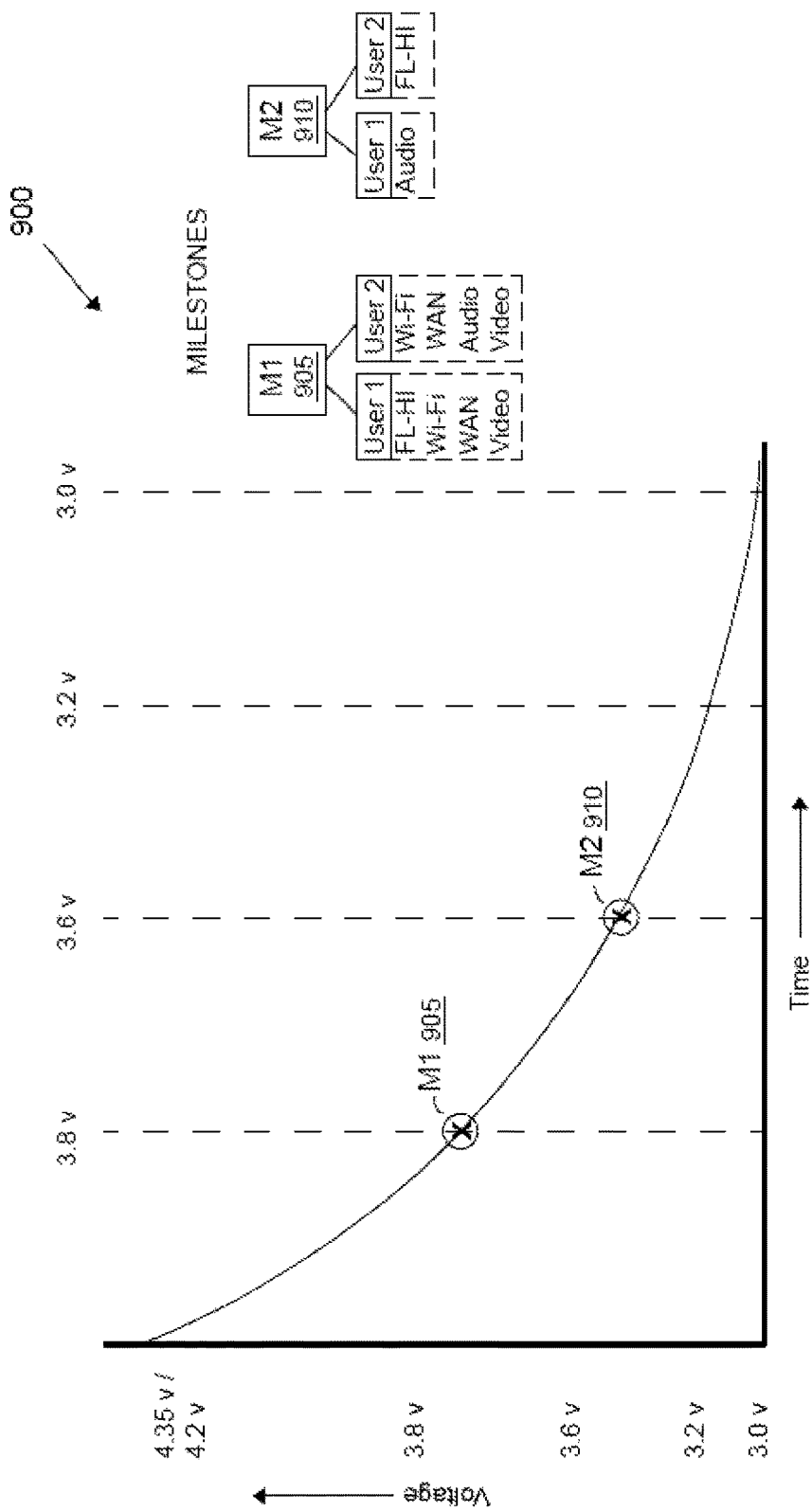
FIG. 9 is another chart showing power conserving settings applied at different battery voltage levels, in accordance with one embodiment.
Figure 10:
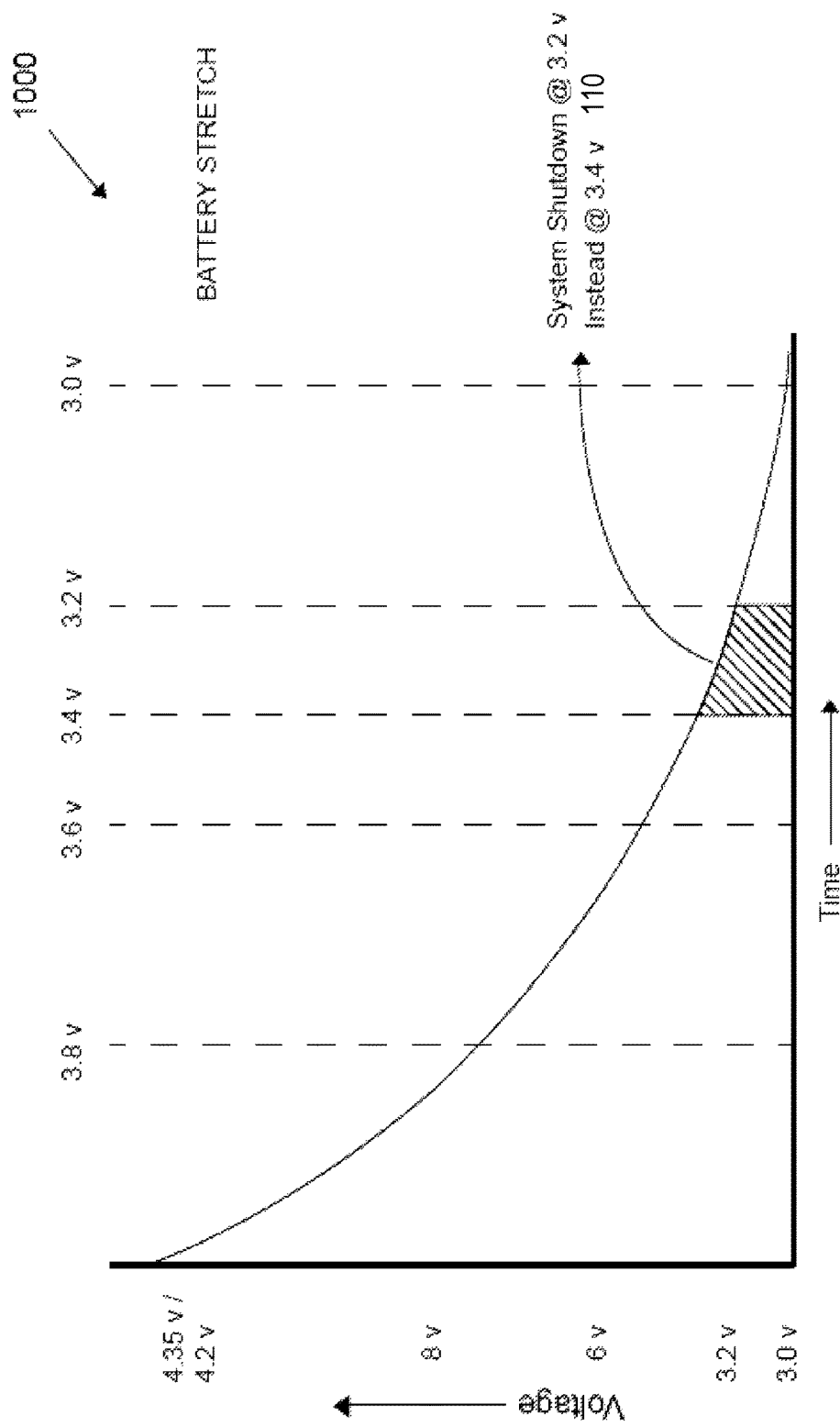
FIG. 10 is a chart showing system shutdown applied at a reduced battery voltage level, in accordance with one embodiment.

FIGS. 8-10 are charts showing power conserving settings applied at different battery voltage levels, in accordance with various embodiments. In FIG. 8, a chart 800 shows four different operating modes for a mobile device. A standard operating mode is applied between high voltages 805 (e.g., 3.8V and 4.35V). During this operating mode, power usage and activity levels may be learned 825 for the various hardware components, and no hardware components may be shut off.

A conservative power conserving mode is applied at mid voltages 810 (e.g., between voltages 3.8V and 3.6V). During this operating mode, some low usage hardware modules are powered off 830. In particular, low usage modules with high power consumption are turned off first.

An aggressive power conserving mode is applied at low voltages 815 (e.g., between voltages 3.6V and 3.2V). During this operating mode, many hardware modules may be turned off 830. For example, any hardware modules that are non-essential (non-core modules) may be turned off. When the voltage drops below 3.2V, then the mobile device may be powered off 820, with even some or many of the core modules being turned off. Note that more or fewer operating modes may be used, and that different milestone voltage settings may be applied for those operating modes.

FIG. 9 is a chart 900 showing the power conserving settings of FIG. 8 applied at different battery voltage levels to different user profiles, in accordance with one embodiment. In chart 900, when the voltage drops below a first milestone (M1) 905 of 3.8V, the conservative power conserving mode is enabled. For user 1, at the first milestone 905 the conservative power conserving mode shuts off a front light high power (Fl-Hi) hardware component, a Wi-Fi module, a WAN module, and a video processing module. However, for user 2, the conservative power conserving mode shuts off the Wi-Fi module, the WAN module, an audio processing module, and a video processing module.

In chart 900, when the voltage drops below a second milestone (M2) 910 of 3.6V, the aggressive power conserving mode is enabled. For user 1, the aggressive power conserving mode additionally shuts off the audio processing module. For user 2, the aggressive power conserving module additionally shuts off the Fl-Hi module. Processing logic is able to determine which hardware modules are important to a user, weigh this importance against how much power these components use and how often they are used, and then dynamically determine which hardware components to shut off at different times accordingly.

FIG. 10 is a chart 1000 showing system shutdown applied at a reduced battery voltage level (e.g., for battery stretch), in accordance with one embodiment. As shown, the voltage at which the mobile device is shutdown or suspended may be lowered to 3.2V (1010). This may be achieved by shutting down all non-core hardware modules, and only running hardware modules that are able to operate at below 3.4V.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "gathering", "determining", "identifying", "implementing", "deactivating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a mobile device, such as mobile device 100A-100B of FIG. 1. Some methods may be performed by a battery manager (e.g., battery manager 210) of a mobile device.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable storage medium having instructions that, when executed by a processing device of a mobile device, cause the processing device to perform operations comprising:

logging, by the processing device of the mobile device, activity information for a first hardware component of the mobile device, the activity information comprising at least one of an interrupt count over a time period or an amount of data processed by the first hardware component over the time period;

determining, by the processing device of the mobile device, an activity level for the first hardware component based on the activity information, the activity level being a measure of how much the first hardware component is used;

determining, by the processing device of the mobile device, for the first hardware component, a first score by calculating a ratio between the activity level of the first hardware component and an amount of power used by the first hardware component, wherein the first score is related to the amount of power used by the first hardware component; and powering off, by the processing device of the mobile device, the first hardware component after determining the first score is higher than a second score of a second hardware component.

2. The non-transitory computer readable storage medium of claim 1, the operations further comprising:

determining the second score for the second hardware component based on a ratio between a second activity level for the second hardware component and a second power consumption for the second component; and determining that the mobile device is in a power conserving mode.

3. The non-transitory computer readable storage medium of claim 2, the operations further comprising:

determining a first importance value of the first hardware component and a second importance value of the second hardware component, wherein the first importance value represents a level of impact on the mobile device associated with powering off the first hardware component and the second importance value represents a level of impact on the mobile device associated with powering off the second hardware component, and wherein the first score is determined further based on the first importance level and the second score is determined further based on the second importance level;

ranking the first hardware component and the second hardware component based on the first score and the second score; and determining to power off the first hardware component and not the second hardware component based on the ranking.

4. The non-transitory computer readable storage medium of claim 1, wherein the score increases when the amount of power used by the hardware component increases and where the score decreases when the amount of power used by the hardware component decreases.

5. A method comprising:

determining, by a processing device, an activity level for a hardware component of a mobile device based on activity information associated with the hardware component, the activity level being a measure of how much the hardware component is used;

computing, by the processing device, a score for the hardware component, the score reflecting both the activity level and a power consumption value of the hardware component, wherein the power consumption value indicates an amount of power used by the hardware component, and wherein the score is related to the amount of power used by the hardware component; and determining to deactivate the hardware component based on the score.

6. The method of claim 5, wherein determining to deactivate the hardware component comprises:

identifying a deactivation rule associated with a current power conserving mode; and determining that the score for the hardware component satisfies the deactivation rule.

7. The method of claim 6, further comprising:

responsive to determining that the score satisfies the deactivation rule, automatically deactivating the hardware component without user input.

8. The method of claim 7, further comprising:

providing a false status of the hardware component, wherein the false status indicates that the hardware component is active.

9. The method of claim 6, further comprising:

responsive to determining that the score satisfies the deactivation rule, prompting a user to indicate a deactivation preference for the hardware component; and deactivating the hardware component responsive to a user selection to deactivate the hardware component.

10. The method of claim 6, further comprising:

determining that a battery level of the mobile device has reached a threshold;

switching the mobile device to a new power conserving mode associated with the threshold, wherein the new power conserving mode is associated with a new deactivation rule; and determining to deactivate the hardware component based on the score and the new deactivation rule.

11. The method of claim 5, further comprising:

determining an importance value associated with the hardware component, wherein computing the score for the hardware component comprises computing the score based on the activity level, the power consumption rating and the importance value, wherein an increase in the activity level contributes to a decrease in the score, an increase in the importance value contributes to a decrease in the score, and an increase in the power consumption rating contributes to an increase in the score.

12. The method of claim 5, wherein the hardware component is one of a plurality of hardware components, the method further comprising:

receiving activity information for the plurality of hardware components;

determining activity levels of the plurality of hardware components based on the activity information;

determining importance values for the plurality of hardware components based on at least one of preconfigured settings or the activity levels;

computing scores for the plurality of hardware components based on a combination of the activity levels, the importance values and power consumption values of the plurality of hardware components; and identifying a subset of the plurality of hardware components to deactivate based on the scores.

13. The method of claim 5, wherein the activity level is based on at least one of an interrupt count for the hardware component or an amount of data handled by the hardware component.

14. The method of claim 5, wherein determining the activity level comprises:

determining at least one of a current time or a current location; and determining at least one of a time-specific or a location-specific activity level based on the activity information and at least one of the current time or the current location.

15. A mobile computing device comprising:

a first hardware component and a second hardware component; and a processing device coupled to the first and second hardware components, the processing device to:

determine a first activity level for the first hardware component over a time period, wherein the first activity level is a measure of how much the first hardware component is used;

determine a second activity level for the second hardware component over the time period, wherein the second activity level is a measure of how much the second hardware component is used;

identify a first power consumption value for the first hardware component, wherein the first power consumption value to indicate an amount of power consumption attributable to the first hardware component;

identify a second power consumption value for the second hardware component, wherein the second power consumption value to indicate an amount of power consumption attributable to the second hardware component;

compute a first score for the first hardware component, the score reflecting both the first activity level and the first power consumption, wherein the first score is related to the first power consumption value;

compute a second score for the second hardware component, the score reflecting both the second activity level and the second power consumption value, wherein the second score is related to the second power consumption value; and determine to deactivate the first hardware component when the first score is higher than the second score.

16. The mobile computing device of claim 15, wherein to determine to deactivate any at least one of the first and second hardware components, the processing device is to:

identify a deactivation rule associated with a current power conserving mode; and determine that a score for the at least one of the first and second hardware components satisfies the deactivation rule.

17. The mobile computing device of claim 16, wherein the processing device is further to:

responsive to determining that the score for a particular hardware component satisfies the deactivation rule, perform at least one of the following comprising:

automatically deactivate the particular hardware component without user input; or prompt a user to indicate a deactivation preference for the particular hardware component, and deactivate the particular hardware component responsive to a user selection to deactivate the particular hardware component.

18. The mobile computing device of claim 17, wherein the processing device is further to:

determine that a battery level of the mobile device has reached a threshold;

switch the mobile device to a new power conserving mode associated with the threshold, wherein the new power conserving mode is associated with a new deactivation rule; and determine to deactivate at least one of the first and second hardware components based on the first score, the second score and the new deactivation rule.

19. The mobile computing device of claim 15, wherein the processing device is further to:

determine importance values associated with the first and second hardware components, wherein computing a score for a hardware component comprises computing the score based on the activity level, the power consumption rating and the importance value, wherein an increase in the activity level contributes to a decrease in the score, an increase in the importance value contributed to a decrease in the score, and an increase in the power consumption rating contributed to an increase in the score.

20. The mobile computing device of claim 15, wherein the processing device is further to:

log activity information for the first and second hardware components, the activity information comprising at least one of interrupt counts for the first and second hardware components or amounts of data handled by the first and second hardware components, wherein the activity levels are determined based on the activity information; and determine a subset of the plurality of hardware components to deactivate based on the first score and the second score; and deactivate the subset of the first and second hardware components.

21. The mobile computing device of claim 15, wherein each of the first score and the second score comprises a ratio between an activity level and a power consumption value.

22. The mobile computing device of claim 15, wherein deactivated hardware components appear to applications that execute on the mobile computing device as active hardware components.

\* \* \* \* \*